United States Patent
Houlbert et al.

(10) Patent No.: US 10,915,363 B2
(45) Date of Patent: Feb. 9, 2021

(54) RESOURCE SHARING CONTROLLER OF A COMPUTER PLATFORM AND ASSOCIATED RESOURCE SHARING METHOD

(71) Applicant: THALES, Courbevoie (FR)

(72) Inventors: David Houlbert, Saint-Médard-en-Jalles (FR); Alexandre Fine, Saint-Médard-en-Jalles (FR); Nicolas Dubois, Saint-Médard-en-Jalles (FR); Frederic Sanson, Le Haillan (FR); Laurent Jardin, Saint-Jean-d'Illac (FR)

(73) Assignee: THALES, Courbevoie (FR)

( * ) Notice: Subject to any disclaimer, the term of this patent is extended or adjusted under 35 U.S.C. 154(b) by 89 days.

(21) Appl. No.: 16/425,628

(22) Filed: May 29, 2019

(65) Prior Publication Data

US 2019/0370070 A1 Dec. 5, 2019

(30) Foreign Application Priority Data

Jun. 5, 2018 (FR) ..................................... 18 00564

(51) Int. Cl.
*G06F 9/50* (2006.01)
*G06F 13/16* (2006.01)
*G06F 3/06* (2006.01)

(52) U.S. Cl.
CPC .......... *G06F 9/5016* (2013.01); *G06F 3/0659* (2013.01); *G06F 13/16* (2013.01); *G06F 13/1689* (2013.01)

(58) Field of Classification Search
CPC ...... G06F 9/5016; G06F 13/16; G06F 3/0659; G06F 13/1689
See application file for complete search history.

(56) References Cited

U.S. PATENT DOCUMENTS 5,867,686 A 2/1999 Conner et al.
6,496,899 B1 * 12/2002 DeMoney ............... G06F 3/061
                                                                                         348/E5.008

(Continued)

FOREIGN PATENT DOCUMENTS

FR    2 919 084 A1    1/2009
FR    3 041 788 A1    3/2017
WO    WO 2016/034447 A1    3/2016

OTHER PUBLICATIONS

Communication issued by the French Patent Office in counterpart French Application No. 1800564, dated Feb. 13, 2019.

*Primary Examiner* — Benjamin C Wu
(74) *Attorney, Agent, or Firm* — Arent Fox LLP

(57) ABSTRACT

A resource sharing controller adapted for operating in a computer platform further comprising a data storage medium and software applications comprising access commands to the storage medium,
adapted, as a function of a respective portion allocated to each application, of a maximum access capacity to the storage medium, as a function of a list of next commands of access to the storage medium of each application and further of the theoretical maximum performance times of said commands, for selecting, for each application and for a next temporal cycle for access to the storage medium, the next commands to be implemented and for successively distributing, during said next temporal cycle, the access to each application for the implementation of said selected commands.

10 Claims, 5 Drawing Sheets

(56) References Cited

U.S. PATENT DOCUMENTS

| | | | |
|---|---|---|---|
| 6,721,789 B1* | 4/2004 | DeMoney | G06F 3/061 |
| | | | 348/E5.008 |
| 2008/0126580 A1* | 5/2008 | Tripathi | G06F 3/0613 |
| | | | 710/5 |
| 2009/0217280 A1 | 8/2009 | Miller et al. | |
| 2009/0313441 A1* | 12/2009 | Mochida | G06F 13/1663 |
| | | | 711/150 |
| 2010/0011182 A1* | 1/2010 | Le Moal | G06F 3/0659 |
| | | | 711/167 |
| 2017/0017412 A1* | 1/2017 | Luan | G06F 13/1663 |
| 2017/0147249 A1* | 5/2017 | Hower | G06F 3/0604 |

* cited by examiner

RESOURCE SHARING CONTROLLER OF A COMPUTER PLATFORM AND ASSOCIATED RESOURCE SHARING METHOD

CROSS-REFERENCE TO RELATED APPLICATIONS

This application claims priority to French Patent Application No. 18 00564, filed on Jun. 5, 2018. The disclosure of the priority application is incorporated in its entirety herein by reference.

TECHNICAL FIELD

The present invention relates to the field of computer platforms comprising at least one processor, a data storage medium, software applications adapted for being executed on the processor and comprising access commands to the storage medium.

A mass memory is a high-capacity storage medium (typically more than 8 GB, or more than 256 GB or more), non-volatile, and which can be read and written by applications executed on a processor. The media of these mass memories can be of various types, for example magnetic tape, hard disk drive, solid state drive (SSD), SD (Secure Digital) card, optical disc (CD, DVD, Blu-ray), magneto-optical drive, flash memory, etc. and comprise unitary memory cells and a memory controller adapted for operating on the cells as a function of received commands and for delivering or recording data derived from these operations.

BACKGROUND

The performance induced by the mass memory technologies shared between the applications and the quantity of data handled are not compatible with an execution in a short amount of time (for example less than 100 ms) for the operations conducted on these memories. These operations are typically creation, read, write, deletion, naming, classification, archiving operations in particular, controlled by the applications, applied on memory zones of variable size, and they are conducted on the mass memory via a file manager.

In the avionics sector among others, with the increased number and growing complexity of avionics functions, manufacturers group together several software applications on a same high-performance computer processing platform. To respond to this new context, so-called Integrated Modular Avionics (IMA) directives have been developed, according to which a computer processing platform must be able to provide robust partitioning, both temporal and spatial, between applications, allowing them to share a same platform and its resources, in particular including data storage media, also called mass memories.

As an illustration, in avionics, the "Synthetic Vision System (SVS), "Flight Management System (FMS) and "Terrain Avoidance Warning System (TAWS) applications all three utilize shared ground and relief map definition data and therefore necessarily involving shared access, in association with which it is further possible for the applications to store annotations, log files, etc., all of which is stored on a mass memory of from 16 GB to 256 GB.

There is therefore an increased need to guarantee robust partitioning between several applications sharing files that may be shared or specific to each application within a same mass memory, in a real-time processing context.

SUMMARY

To that end, according to a first aspect, the invention proposes a resource sharing controller adapted for operating in a computer platform further comprising at least:
a processor,
a data storage medium,
software applications adapted for being executed on the processor and comprising access commands to the storage medium,
said resource sharing controller being characterized in that it is adapted, as a function of a respective predetermined portion, allocated to each application, of a maximum access capacity to the storage medium, as a function of a list of next commands of access to the storage medium to be executed derived from each application and further as a function of the theoretical maximum performance times of said commands, for selecting, in a first selection phase, for each application and for a next temporal cycle for access to the storage medium, the next commands to be implemented and for successively distributing, during said next temporal cycle, the access to said medium to each application for the implementation of said selected commands.

The invention makes it possible to guarantee controlled sharing between the applications of the access to the data storage medium, which limits the risks of overflow from one application to the others, corresponding to the particularities of the mass memories. This sharing makes it possible to provide the independence of the applications for accesses to the mass memory resource.

The invention makes it possible to allocate a timeslot and memory per application. The use of the timeslot relative to a bandwidth or quantity of data has the advantage of distancing itself from the great variability in performance of mass memory technologies as a function of the size and sequential or random access type. The invention makes it possible to have total independence between the applications using the same resource in order to allow the integration of several applications on the same module while meeting operating safety needs, as well as development efficiency needs.

The invention further contributes to decreasing the number of computers (sharing a platform between several applications) and reducing work for a certification, for example European ETSO ("European Technical Standard Order"). In embodiments, the resource sharing controller according to the invention further includes one or several of the following features:
the maximum access capacity is an element from among a maximum temporal cycle time for access to the storage medium, a maximum bandwidth of the storage medium and a maximum volume of data exchanged with the storage medium;
the resource sharing controller is adapted, when the performance of the commands selected during the first selection phase for the temporal cycle in progress for the applications is completed, in a second selection phase, to select additional commands from among the next commands remaining to implement for each application, as a function of the time remaining until expiration of the temporal cycle in progress, a weight assigned to each application and theoretical maximum times for performance of said commands;
the resource sharing controller is adapted for defining a unitary element corresponding to a data size and associated with a unitary access capacity to the storage medium, determining, for each application, a number of unitary capacities corresponding to the predetermined respective portion that has been assigned to it, said controller further being adapted for determining, for each access command, the number of unitary element(s) corresponding to said access command, such that the access command being relative to a data block, said number of unitary element(s) will be 1 if the block has a size smaller than or equal to that of the unitary element and will be n if the block has a size equal to n times the size of the unitary element, the controller being adapted for selecting, for said application, the next commands to be implemented in the first selection phase as the maximum successive commands such that the sum of the unitary elements corresponding to said commands is less than the number of unitary capacities corresponding to the predetermined respective portion that was assigned to it;

commands of the list are derived from a maintenance operation of the data storage medium comprising at least one maintenance operation from among a leveling of data storage medium blocks freed by distributing the wear, merging blocks or pages to optimize unaligned random accesses and moving blocks to reduce data retention problems.

According to a second aspect, the present invention proposes a computer platform comprising at least one processor, a data storage medium, software applications capable of being executed on the processor and comprising access commands to the storage medium, and a resource sharing controller according to the first aspect of the invention.

According to a third aspect, the present invention proposes a resource sharing method in a computer platform comprising a resource sharing controller, at least one processor, a data storage medium, software applications capable of being executed on the processor and comprising access commands to the storage medium said method being characterized in that it comprises the following steps implemented by the resource sharing controller and consisting of:

as a function of a respective predetermined portion, allocated to each application, with a maximum access capacity to the storage medium, as a function of a list of next access commands to the storage medium to be executed derived from each application and further as a function of the theoretical maximum performance times of said commands, for selecting, in a first selection phase, for each application and for a next temporal cycle for access to the storage medium, the next commands to be implemented and for successively distributing, during said next temporal cycle, the access to said medium to each application for the implementation of said selected commands.

According to another aspect, the present invention proposes a computer program comprising instructions which, when the program is executed by a computer, cause the latter to carry out the method according to the third aspect of the invention.

According to another aspect, the present invention proposes a computer-readable medium, on which the computer program according to the previous aspect of the invention is recorded.

BRIEF DESCRIPTION OF THE DRAWINGS

These features and advantages of the invention will appear upon reading the following description, provided solely as an example, and done in reference to the appended drawings, in which.

DETAILED DESCRIPTION

Figure 1:
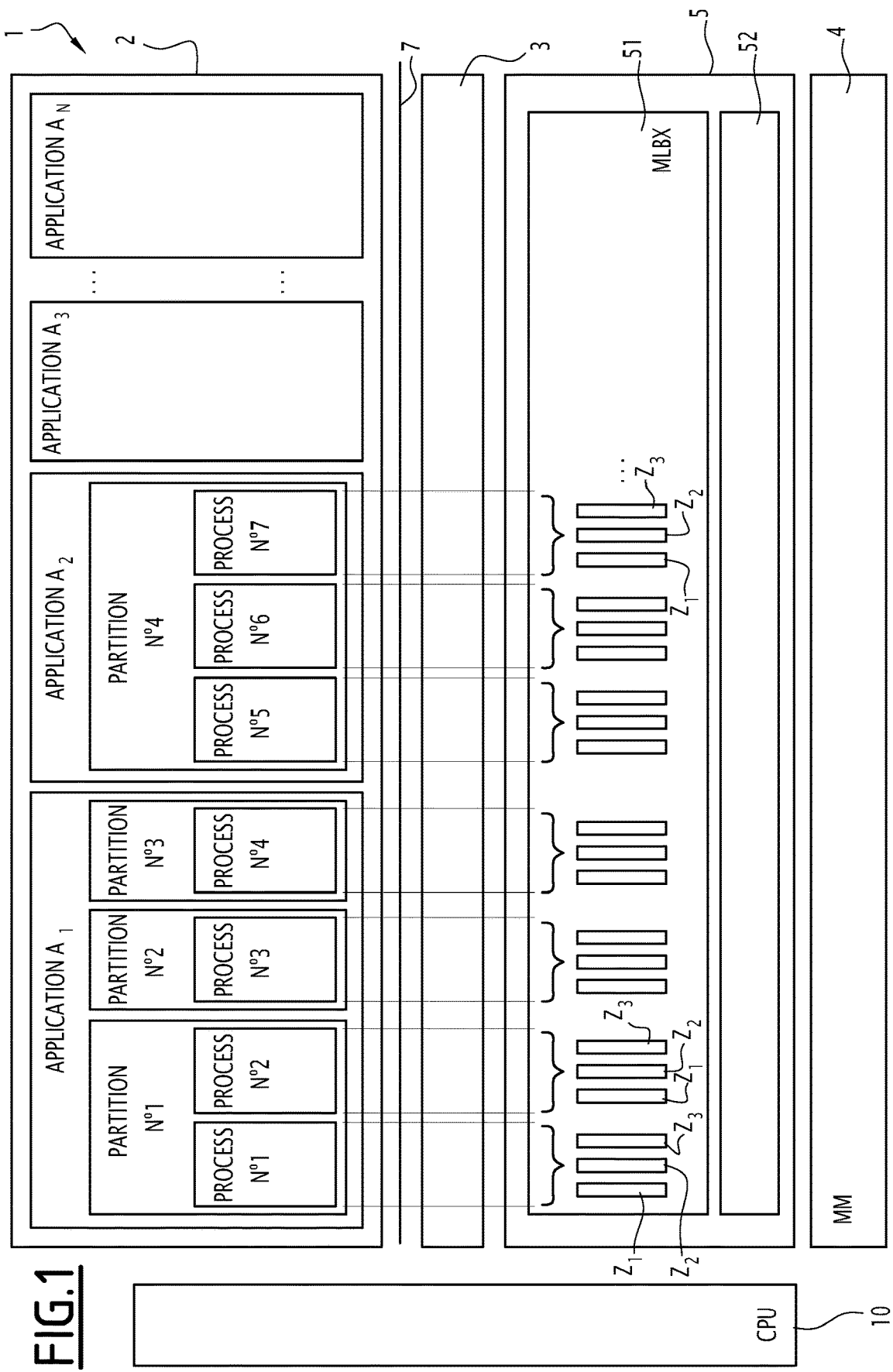
FIG. 1 shows a view of a processing platform in one embodiment of the invention.

FIG. 1 shows a view of a computer processing platform 1 in one embodiment of the invention, for example in the avionics field.

This platform 1 comprises, as is known, one or several processor(s) 10, a set 2 of software applications, a file management system 3 and a mass memory (MM) 4, the use of which is shared between the software applications of the assembly 2.

The platform 1 further comprises, according to the invention, a resource sharing controller 5, arranged between the file management system 3 and the mass memory 4 and the role of which is to provide sharing of the use of this mass memory 4 between the software applications, to prevent the operation of one application from being disrupted by the operation of another application. The partitioning described here is temporal and spatial, but in other embodiments, it can be only spatial or only temporal.

The set 2 of software applications comprises n software applications (n being an integer greater than or equal to 2) A1, A2, . . . An, capable of being executed on the processor 10. These applications for example include the SVS and FMS applications. Additionally, the MM 4 for example comprises ground databases, including the relief.

In the context of temporal and spatial partitioning of ARINC 653 computer resources of the embodiment considered here, a software application could lead to several partitions of this application (ARINC, Report 651, RTCA DO-255).

A partition is a program loadable into a unique addressing space in an integrated module, here the platform 1. The platform 1 (via its operating system, not shown) is adapted for controlling the use, by a partition, of the processing time, of the mass memory 4 and other resources, such that each partition is isolated from the other partitions sharing the platform 1.

The partitions are paced based on a work temporal cycle, maintained by the operating system.

A partition comprises one or several programming units, called processes, sharing the same addressing space, which can operate in parallel and which are combined dynamically to provide the functions associated with the partition.

Thus, when a partition is being executed, certain processes of the partition are implemented, which in turn lead to the execution of access commands to the data of the mass memory, via the file management system 3 for creation, read, write, deletion, naming, classification, data archiving operations between the file management system 3 and the mass memory MM 4, controlled according to the invention by the resource sharing controller 5.

In the case considered in reference to FIG. 1, the application A1 for example comprises 3 partitions (Partition no. i, i=1 to 3). Partition no. 1 comprises 2 processes (Process no. j, j=1 to 2). Partition no. 2 comprises process Process no. 3. Partition no. 3 comprises process Process no. 4. Application A2 comprises a partition (Partition no. 4), which comprises 3 processes (Process no. k, k=5 to 7), etc.

The resource sharing controller 5 comprises an MLBX exchange block 51 and a processing block 52 adapted for executing commands stored in submission queues $Z_k$ (k=1 to 3) of the MLBX exchange block 51, according to a specific algorithm (allowing the sharing of the bandwidth), to interpret each command in order to send them to the mass memory 4, taking into account the aging of the components, in order to keep the data available over time.

Temporal Partitioning

The bandwidth, i.e., the overall size of the data that can be accessed during a given time, of the hardware resource 4 (for example less than 100 MB/s) coupled with the file size (for example 1 MB) handled by the avionics applications is not adapted for processing in real-time, typically corresponding to frequencies of between 1 and 15 Hertz, like for the communications split between the file management system and the MM hardware resource 4 during the file opening OPEN_FILE( ) or directory opening OPEN_DIRECTORY( ) operations. Furthermore, the times required by the read or write operations are not deterministic.

The resource sharing controller 5 according to the invention corresponds to an additional layer, relative to the traditional computer platform architectures, arranged between the file management system 3 and the MM hardware resource 4, and is adapted for sequencing the parallel requests coming from the applications and intended for this mass memory MM 4 while providing a distribution of the maximum access capacity of the mass memory as a function of ratios of this maximum capacity allocated to the respective partitions while taking into account worst-case execution times. This "worst-case execution time" characterization takes account of the great variability in performance of the mass memory and the variabilities introduced by the internal algorithm of the mass memory optimizing its lifetime and the data retention.

The resource sharing controller 5 is adapted for processing the operations in progress required by a partition according to the following characteristics:
  even if another partition is then in the process of working on the processor 10;
  while respecting predetermined priorities.

The resource sharing controller 5 is adapted for working in a work cycle, in two steps. It first distributes, to each partition, the access ratio to the mass memory 4 that has been allocated to it (therefore corresponding to a bandwidth, time value) or volume of data depending on the considered depiction of the access capacity to the mass memory, these depictions being equivalent); then if there is time remaining to the end of the work cycle after the execution of the commands that each partition has been authorized to perform as a function of the access ratio allocated to it and the worst-case theoretical execution of each command, the bandwidth equivalent to the remaining time is redistributed.

Considering that the set of applications A includes three partitions A, B, C and the following bandwidths have been assigned:
  Partition A: 1 MB/s;
  Partition B: 1.5 MB/s;
  Partition C: 500 KB/s;

in a first example, in the scenario where the overall performance of the mass memory in the worst execution time is equal to 8 MB/s, the entire offered access capacity to the mass memory 4 is not consumed and the rest of the data volume (or bandwidth or time) is redistributed to the partitions by the resource sharing controller 5 in order to improve the processing times;

in another example, in the scenario where the overall performance of the mass memory in the worst execution time is equal to 3 MB/s, if the actual performance is better than the performance of the worst processing time, all of the bandwidth that is not consumed is redistributed to the partitions by the resource sharing controller 5 to improve the processing times.

In the considered embodiment, the applications of the assembly 2 and the file management system 3, belonging to the software domain, communicate, through an interface of the NVMHCI (Non-Volatile Memory Host Controller Interface) type, also called NVMe, with the hardware domain to which the resource sharing controller 5 and the mass memory 4 belong. The implementation of the resource sharing controller 5 could, in another embodiment, be made from another interface technology, for example SATA (Serial Advanced Technology Attachment).

The last layer of the file management system 3, responsible for the communication with the mass memory 4 via the resource sharing controller 5, is adapted for posting, to the resource sharing controller 5, read, write or purge (i.e., to empty the memory cells) commands from the processes in progress.

Each new command thus posted is stored in a submission queue that is located in the MLBX exchange block 51 of the resource sharing controller 5: the MLBX exchange block 51 comprises, for each process in each partition, a submission queue $Z_1$ that is dedicated exclusively to it (where the commands posted by the file management system 3 and performance of which is not yet completed are placed), a performance queue $Z_2$ that is dedicated exclusively to it (where the execution statuses of commands are placed) and a data area $Z_3$ that is dedicated exclusively to it (where the data associated with reading or writing are placed), as shown in FIG. 1.

The use of a resource by an application can be characterized based on a "worst-case execution time" and/or based on a "medium execution time" relative to an instruction or a set of instructions implemented following the execution of the application and comprising one or more accesses to the resource. Typically, such an instruction for example corresponds to the performance of at least one read, write, deletion, data archiving command in the resource. The difference between the two values of "worst-case execution time" and "medium execution time" is generally small (not more than a factor of 2) for conventional resources, but it is radically different for mass memories, where the performance can be multiplied by 10 or more: for example, an erasure operation of a block from a NAND flash cell can take from 1.5 milliseconds (ms) to 15 ms.

The resource sharing controller 5 is adapted for distributing the access capacity to the mass memory MM 4 between the different active partitions, while respecting theoretical access capacity allocations to the mass memory respectively allocated to these applications. In one embodiment, the resource sharing controller 5 is adapted for distributing the access capacity to the mass memory MM 4 between these different application partitions and the maintenance operations on the mass memory 4.

Thus $BW_{MM} = BW_{Partition\ no.\ 1} + BW_{Partition\ no.\ 2} + \cdots + BW_{Partition\ no.\ p}(+BW_{Maintenance})$;

where: $BW_{MM}$ designates the bandwidth of the MM 4, i.e., the size of the data of the memory MM 4 that can be accessed during a given time;
$BW_{Partition\ no.\ i,\ i=1\ to\ p}$ designates the bandwidth granted to partition i, among this total bandwidth of the memory MM 4, accessible by partition i for said given time and $BW_{Maintenance}$ designates the bandwidth allocated to the maintenance operations, the platform comprising n applications A1, . . . , An, the total number of partitions for these applications being equal to p.

The portion assigned to each partition for example results from an allocation done as a function of a budget that was allocated to it resulting from a minimum application need, for example taken into account by the integrator.

In one embodiment described in detail below, the mass memory MM 4 is adapted for operating with the controller 5 according to a work cycle, with duration $T_{HW}$, which may or may not be synchronized with the processing cycle with duration $T_{HW}$ of the processor 10 used to pace the operations of the partitions.

Figure 2:
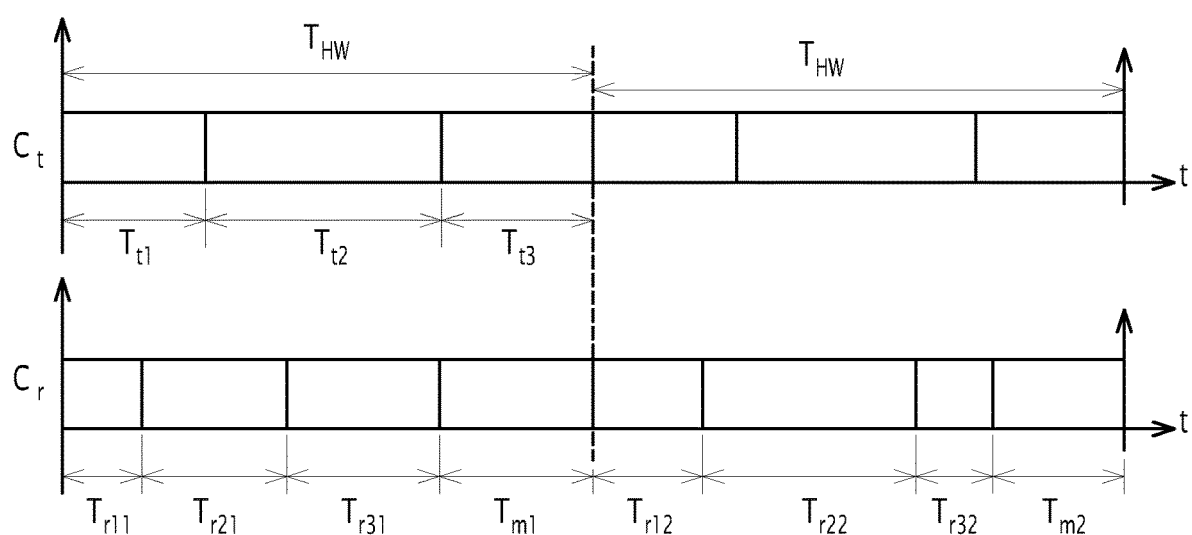
FIG. 2 is a view of a work cycle $T_{HW}$ in one embodiment of the invention.
Figure 5:
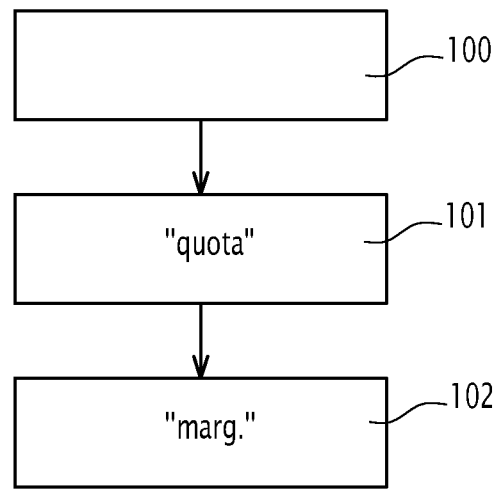
FIG. 5 is a flowchart of steps implemented in one embodiment of the invention.

Thus, in reference to FIG. 2 and FIG. 5, the resource sharing controller 5 is adapted, in a preliminary step 100, for acquiring the ratios of the maximum access capacity to the mass memory assigned to each partition.

Then, in a step 101, called quota step, for each partition, considering the submission list $Z_1$ of this partition, the resource sharing controller 5 determines, in a step 101, which commands posted in this list $Z_1$ (starting from the oldest posted command present in this list) could be processed in the ratio of the access capacity to the mass memory assigned to this partition, if the execution time of each of these commands is the worst execution time of these commands.

Thus, in one embodiment, it determines the time interval portion assigned to each partition for its next cycle with duration $T_H W$ as a function of the respective bandwidth ratio (or the time or volume of data) assigned to this partition.

Thus, the application assembly 2 comprises a total of p partitions (in the illustration of FIG. 2, p=3), the theoretical time interval portion $T_{ti}$, i=1 to p, theoretically assigned to partition no. i is calculated as follows:

$T_{ti} = T_{HW} \times BW_{MM} \div BW_{Partition\ no.\ i}$.

Furthermore, the worst execution time of each command implemented by the partitions has previously been estimated in a preparatory step for the method, for example using tests and measurements.

For each partition, considering the submission list $Z_1$ of this partition, the resource sharing controller 5 determines which commands posted in this list $Z_1$ (starting from the oldest posted command present in this list) could be processed in the theoretical time interval portion calculated for this partition, in the scenario where the execution time of each of these commands is the worst execution time of these commands: it is the maximum of the successive commands considered starting from the oldest such that the sum of their worst execution time is less than the duration corresponding to the calculated theoretical time interval portion allocated to that partition. These commands as determined are the commands selected for the so-called quota step processing step 101.

The commands selected for the partitions are executed.

In one particular embodiment of step 101, a unitary data element is first defined, making it possible in particular to simplify the execution of step 101, as described hereinafter, in reference to FIG. 6 and as follows:

First, the read access to the mass memory (i.e., to the controller of the memory 4 and to the flash NANDs) are characterized by the measurements of the:
time to read (sequentially and randomly) 512 bytes (smallest size exchanged with the controller in the considered case);
time to read (sequentially and randomly) 1 kB;
time to read (sequentially and randomly) 2 kB;
. . .
time to read (sequentially and randomly) 16 kB;
time to read (sequentially and randomly) 32 kB;
. . .
time to read (sequentially and randomly) 512 kB.

It will be noted that the page size, number of controllers, etc. information considered here is used as an example only.

Figure 6:
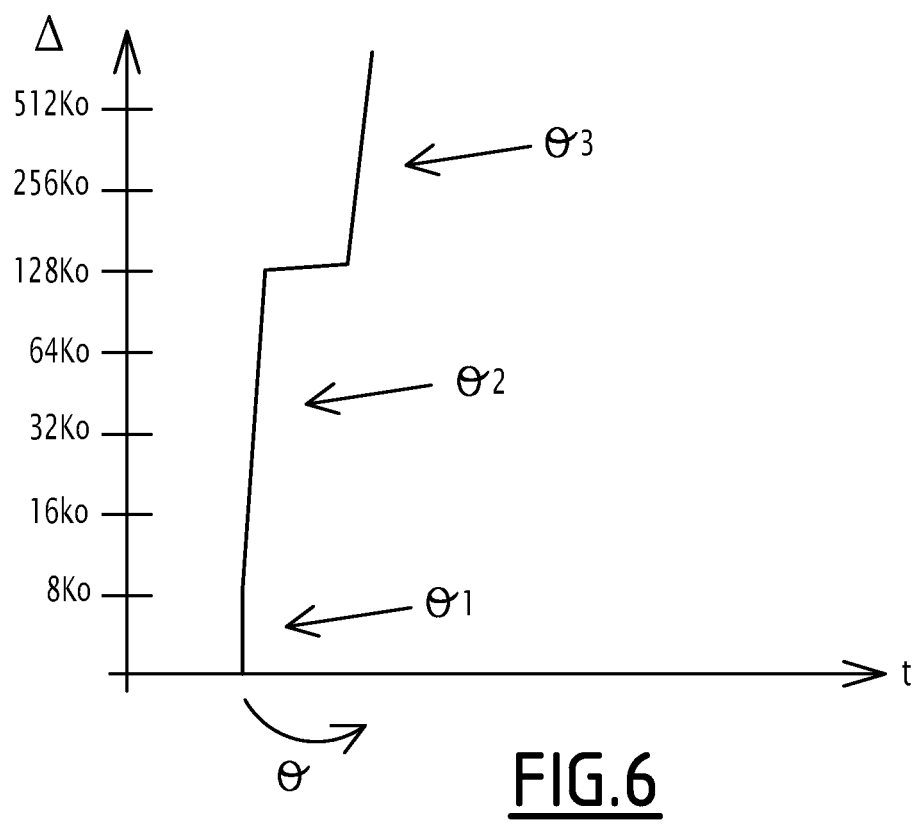
FIG. 6 illustrates an example of maximum access time to a mass memory as a function of the size of the data in question.

The performance "worst cases" for reading in the mass memory 4 can thus be mapped (the same tests and graphs are done the same way for writing), as shown in FIG. 6, with the access time to a block of the mass memory 4 on the x-axis as a function of the size of the block shown on the y-axis in one example. θ1 designates the section [512 bytes; 8 bytes] and corresponds to the recovery time of the page, θ2 designates the section [8 bytes; 128 bytes] and corresponds to the recovery time of a page on 16 channels in parallel (1 channel=1 controller+1 flash NAND), and θ3 designates the section [128 bytes; 256 bytes] and corresponds to the recovery time of two pages on 16 channels in parallel.

Globally, one can see, in the specific considered case, that it is substantially always the same worst time, for any data size between 1 byte and 128 kB.

The size 16 kB is then chosen as unitary element size (another size in the considered range could have been chosen, but it was determined through multiple tests that this size optimized the efficiency of the processing).

By using the hypothesis that the memory access time is equal to 400 µs, from 1 byte to 128 kB, the corresponding bandwidth values are therefore:
For 512 bytes: 1.22 MB/s
For 16 kB: 39 MB/s
For 64 kB: 156 MB/s
For 128 kB: 312 MB/s All accesses below 16 kB will be counted from 16 kB. Accesses above 16 kB will be counted as multiples of 16 kB.

Therefore, smoothing over one second, 39 MB/s is shared between the partitions.

To then determine the number of unitary elements per work cycle per partition, in step 101, in the case where half of the bandwidth is assigned to partition no. 1 and where one work cycle lasts 100 ms, there are several ways of operating (whether one considers the bandwidth or the time or the volume of data in fact amounts to calculating the same number of unitary elements):
according to a first example, considering the bandwidths: 39 MB/s/10 cycles in 1 s→3.9 MB/size of the unitary element→250 unitary elements in total/½→125 unitary elements reserved for partition no. 1;
According to a second example considering the time: 1 s/400 µs (400 µs being a value selected as an example giving the worst-case performance associated with the reading of a page of the Flash NAND)→2500/10 cycles in 1 s→250 unitary elements in total→125 elements reserved for partition no. 1.

In step 101, for each command, the controller 5 counts the number of unitary elements corresponding to the command as a function of the size of the data handled by the command (i.e., 1 unitary element if the size is less than or equal to 16 kB, and n unitary elements if this size is n times 16 kB). And the commands of the partition 1 selected in the quota step 101 are the successive commands of the list such that the cumulative sum of their unitary elements is less than the number of unitary elements reserved for the partition 1.

For example, in the case of a command corresponding to 5 unitary elements, it will therefore remain after selection of the command, 120 elements reserved for Partition no. 1 to select the following commands.

However, the number of unitary elements reserved for Partition no. 1 in particular corresponds to the case of the execution of successive commands of 1 unitary element.

Yet the time actually consumed by the execution of a command of 5 unitary elements (80 kB) is practically identical to that consumed by a command of 1 unitary element (80 kB), therefore the available time may be redistributed, as outlined below in step 103 (5 commands of 1 unitary element=5×400 μs; 1 command of 5 unitary elements=500 μs<<5 commands of 1 unitary element).

The graph $C_t$ with the portions $T_{ti}$, i=1 to p=3, assigned to the partitions no. 1 to p=3 indicates, for each partition, the theoretical maximum time that will be necessary to process the commands selected in the quota step 101. The resource sharing controller 5 is thus adapted for guaranteeing that the commands selected in this quota step 101 will be carried out for each partition once the commands selected for the partition i have been executed, the commands selected for the partition i+1 are in turn carried out until i+1=p.

The graph $C_r$ with the actual time portions occupied to carry out the commands of partitions no. 1 to p=3 indicates, for each partition, the actual time to process the commands selected in the quota step.

Then, in a step 102 called margin step, the resource sharing controller 5 calculates the time remaining until the end of its current work cycle, in the case where at least actual times to perform the selected commands, $T_{ri}$, i=1 to p, have been less than the theoretical times $T_{ti}$, i=1.

If time remains, i.e., if $T_{t1}+T_{t2}+ \ldots +T_{tp}-T_{r1}-T_{r2}- \ldots -T_{rp}$ is greater than 0, the resource sharing controller 5 distributes the remaining time until the end of its current cycle, between the partitions to process one or more commands in the submission list. In one embodiment, this redistribution between the partitions is done as a function of the weight coefficient P assigned to each submission queue. This weight coefficient for example corresponds to a number of commands present in the submission queue Z1 associated with the partition. Thus, if the weight coefficient is different from 0, one or several commands can be carried out as a function of the remaining time if the cumulative worst execution time of the additional commands then selected is less than the remaining time. It can be favored by the resource sharing controller 5 to select the associated commands by decreasing order of weight coefficient. The weight coefficients are decremented over the course of the selection of commands for the distribution that is respectively associated with them.

If, at the end of the performance of the selected commands to occupy the remaining time, time still remains until the expiration of the current cycle, step 102 is reiterated.

In FIG. 2, during a first work cycle, the actual times for partitions nos. 1, 2, 3 at the end of step 102 have been denoted $T_{r11}$, $T_{r21}$, $T_{r31}$ and the remaining time $T_{m1}$. During a second work cycle, the actual times for partitions nos. 1, 2, 3 at the end of step 102 have been denoted $T_{r12}$, $T_{r22}$, $T_{r32}$ and the remaining time $T_{m2}$.

Figure 3:
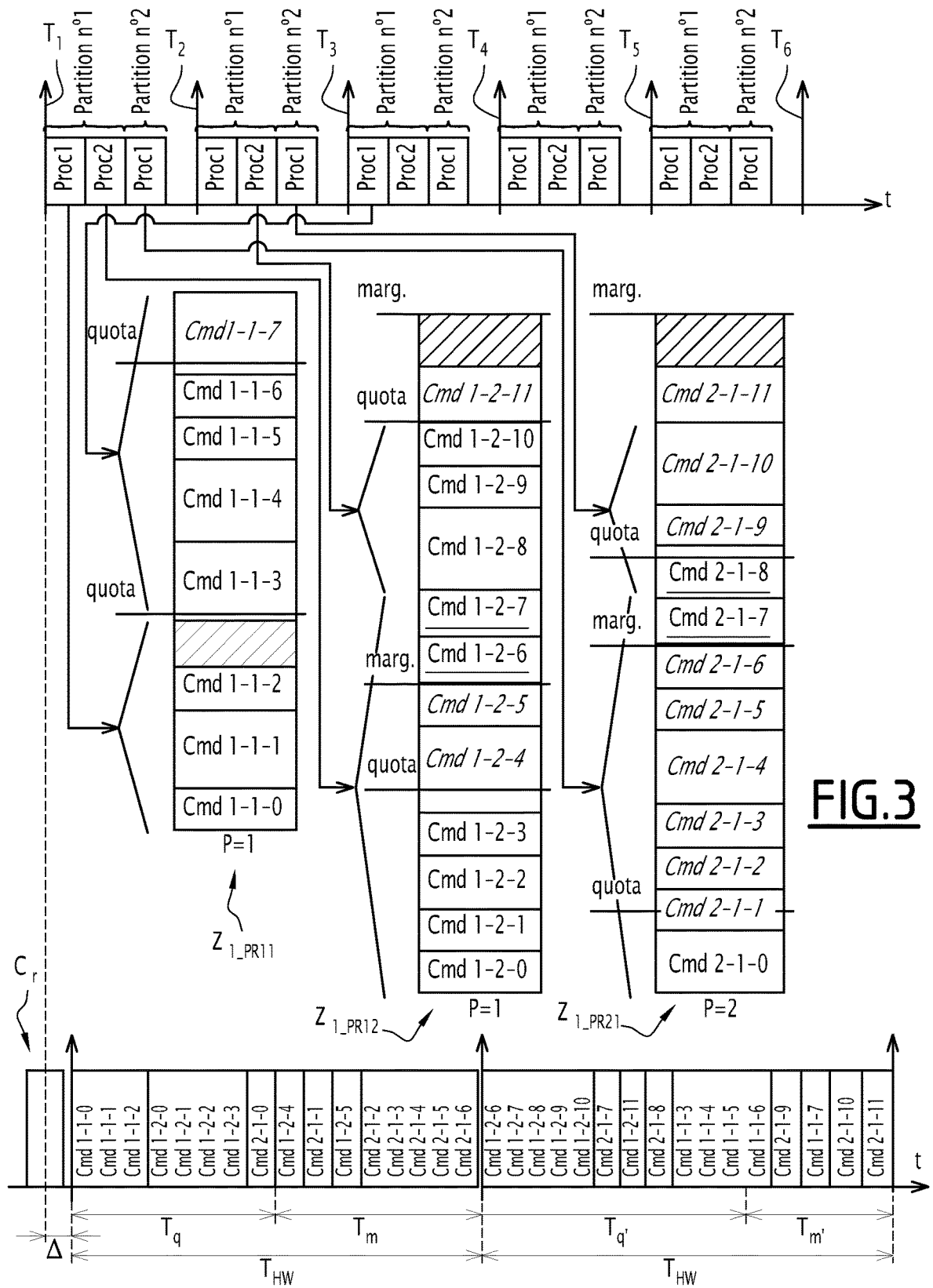
FIG. 3 is a diagram illustrating a temporal partitioning of operations between applications in one embodiment of the invention.

FIG. 3 illustrates an example of sharing access to the mass memory 4, when the set A of applications includes p=2 partitions: partition no. 1 comprising the processes Proc1 and Proc2 of Partition no. 1 and partition no. 2 including process Proc1 of partition no. 2. The temporal graph in the upper part of FIG. 3 illustrates that the 3 processes generate, via the file management system 3, commands during successive cycles $T_i$–$T_{i+1}$, with duration $T_{HW}$ and the moments $T_1$ to $T_6$ of which are shown. The commands generated by each of the processes are posted by the file management system 3 in respective submission queues: submission queue Z1_PR11 comprises the commands derived from the process Proc1 of partition no. 1, submission queue Z1_PR12 comprises the commands derived from the process Proc2 of partition no. 1 and submission queue Z1_PR11 comprises the commands derived from process Proc1 of partition no. 2.

The arrows and braces connecting the processes indicated in the temporal graph of the upper part of FIG. 3 and commands of the submission queues identify which commands are posted during which work cycles of the processes. Thus, the commands Cmd1-1-0, Cmd1-1-1 and Cmd1-1-2 derived from the process Proc1 of partition no. 1 have been posted in queue Z1_PR11 during work cycle [$T_1$–$T_2$].

Temporal graph $C_r$ in the lower part of FIG. 3 illustrates the monitoring of the resource sharing done by the resource sharing controller 5. It sequences the processing of the commands of the processes according to a duration cycle also with duration $T_{HW}$, for example desynchronized, with a time Δ, relative to the cycle pacing the work of the processes.

Thus, as described above in reference to FIG. 5, in a quota step, the resource sharing controller 5 has selected the commands Cmd1-1-0, Cmd1-1-1, Cmd1-1-2 of the process Proc1 of partition no. 1, Cmd1-2-0, Cmd1-2-1, Cmd1-2-2, Cmd1-2-3 of the process Proc2 and Cmd 2-1-0 of the process Proc1 of partition no. 2, and posted in the current work cycle ? HW. The processing of these commands being done in a time Tq, there remains a time Tm during which at least one margin step is carried out by the resource sharing controller 5 making it possible to process additional commands until the end of the considered work cycle. Then a new work cycle begins with a quota step with duration Tq' and a margin step with duration Tm'.

The weight values P indicated under each submission queue are for example priority values of the queues defined during their creation.

In the submission queues, the commands processed by the resource sharing controller 5 for performance during the current step of the margin step type are indicated in italics, those that will be processed for execution in the following step are underlined, while those processed for execution during the current step of the quota step type are indicated in "standard" characters, i.e., neither italics nor underlined.

Figure 4:
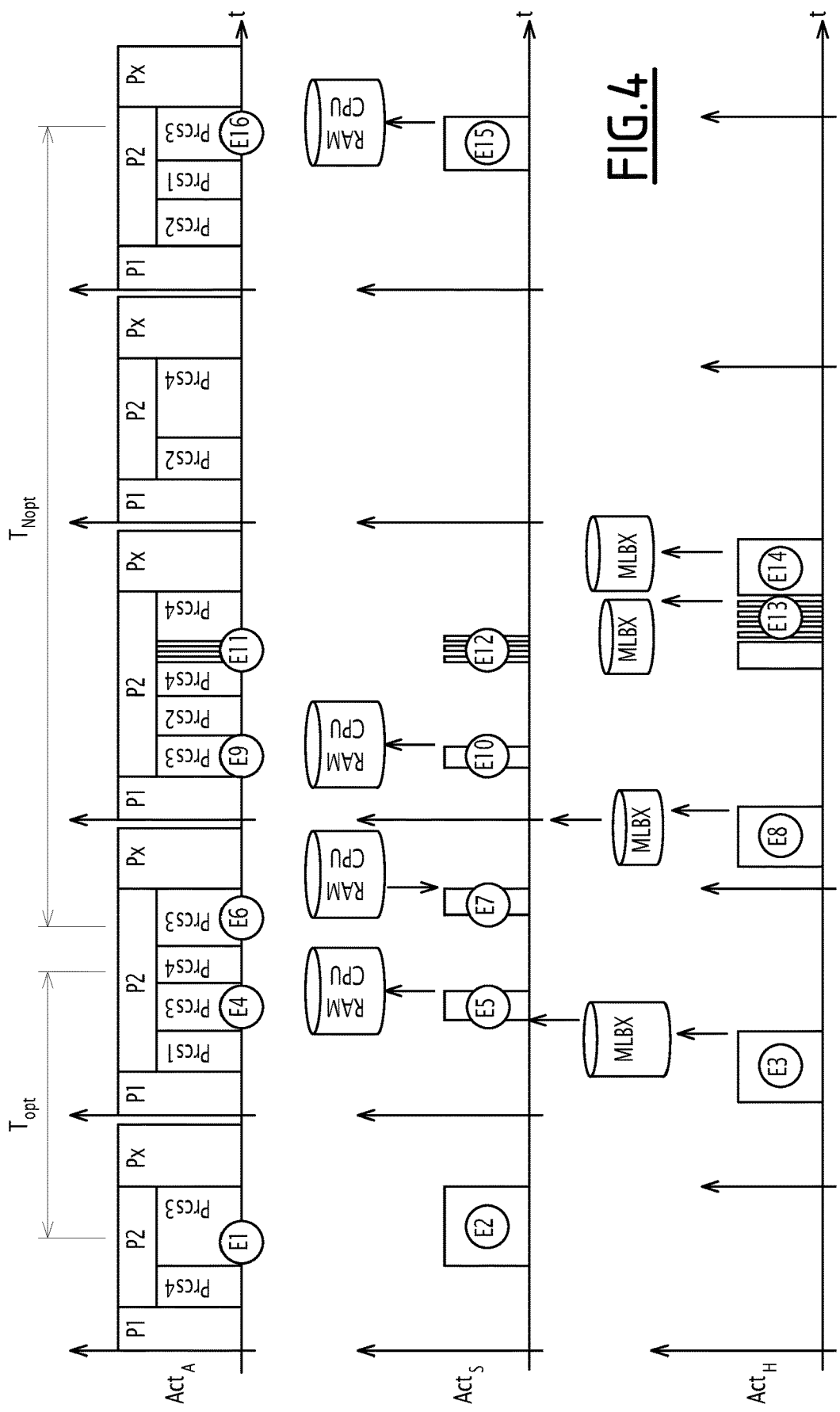
FIG. 4 is a diagram illustrating a temporal partitioning of operations between applications in one embodiment of the invention.

Hereinafter in reference to FIG. 4, operations sequencing is described when an application calls on the READ-FILE( ) function. ActA represents the activities at the applications level, ActS represents the activities at the file system level developed in software, in particular at the file management system level, and ActH represents the activities at the hardware level, in particular those of the resource sharing controller 5 and mass memory level.

Simple READ-FILE( ):

$E_1$: the process Proc3 calls the read file function READ-FILE( ).

$E_2$: the file system takes over to translate the read command into a low-level command depending on the type of file system (FAT 32, RAW, NTFS, etc.), it performs certain file management tasks, then it generates the read commands corresponding to this read file function and intended for the mass memory 4; it posts these commands in the submission queue that is associated with the process Prcs3 of the partition P2 and that is found in the MLBX exchange block 51 of the resource sharing controller 5.

$E_3$: the commands in this submission queue are selected, the read data are posted in the performance queue associated with the process Prcs3 and that are found in the MLBX exchange block 51 of the resource sharing controller 5.

$E_4$: the process Prcs3 is sequenced again on the processor 10 (by the operating system), which allows the file system service 3 to continue these tasks until the processing in progress is completed.

$E_5$: the file management system has detected, by probing the performance queue, that read requests have been performed and are available in the MLBX exchange block 51. Then it repatriates the data in the RAM memory of the processor 10 (RAM CPU). Not having additional data, it completes the processing of the READ-FILE( ) function and it returns control to the calling process.

Complex READ-FILE( ), i.e., the read operation is split over several work cycles (whereas in the "simple" case described above, it was done on the current cycle).

$E_6$: the process Prcs3 calls the read file function READ-FILE( ).

$E_7$: the file management system 3 performs certain tasks, then it generates read commands corresponding to this function called read file function READ-FILE( ) and intended for the mass memory 4; it next posts these commands in the submission queue associated with the process Prcs3.

$E_8$: the commands selected in the submission queue for the quota step are executed, the read data are posted in the performance queue associated with the process Prcs3 and that are found in the MLBX exchange block 51 of the resource sharing controller 5.

$E_9$: the process Prcs3 is sequenced again and is still in the context of the file system 3 until the processing in progress is completed.

$E_{10}$: the file management system has detected, by probing the performance queue, that data was available in the MLBX exchange block 51 and it copies this data into the RAM memory of the processor 10 (RAM CPU).

$E_{11}$: the process Prcs3 is sequenced again several times in the context of the file system until the processing in progress is completed.

$E_{12}$: the file management system is sequenced several times. Not having available data coming from the resource sharing controller 5, it will give control to the other processes.

$E_{13}$: the resource sharing controller 5 has distributed all of the time portions to the partitions in a quota step, then it gives control back to the processor Prcs3 in a margin step.

$E_{14}$: the resource sharing controller 5 processes new commands present in the submission queue according to the portion assigned to the partition P2.

$E_{15}$: the file management system has detected, by probing the performance queue, that data was available in the MLBX exchange block 51 and it copies this data into the RAM memory of the processor 10 (RAM CPU). Not having additional data, it completes the processing of the READ-FILE( ) function and it returns control to the calling process.

In one embodiment, the maintenance tasks are processed as an application partition of the set A by the resource sharing controller 5: a bandwidth is assigned to them, from which a theoretical time interval is determined; then commands are selected, as indicated in steps 100, 101, 102 of FIG. 5, in order to perform the maintenance operations such as:

leveling new blocks of the mass memory 4 freed by distributing the wear ("wear leveling");

merging blocks or pages, caused by unaligned random accesses, to optimize performance;

moving blocks to prevent data retention problems (close to the limit of the maximum correction capacity by cyclic redundancy control (CRC));

. . . .

One difficulty with mass memories is that the access times are not deterministic (i.e., there are differences between the access times for same quantities of data). In particular, it is observed in the cases of a mass memory of the memory controller and flash NAND type, that although sequential accesses in read or random modes are very deterministic (the minimum and maximum bandwidths are very close), the same is not true for sequential or random accesses in write mode. Furthermore, certain memory controllers (in particular often the COTS (commercial off-the-shelf) memory controllers) implement, in the pipeline, write operations to take advantage of cache effects in order to improve performance. Memory controllers can in fact group together write operations regarding a same block or a same page. It is possible to group together read commands, but it is not possible to wait to send the data to the user, unlike for writing, the response to such an operation contains read data. A read operation is considered in a unitary manner. However, it can benefit from a cache effect if the next read data relate to a page or a block already in cache. Thus, a memory controller can announce a write operation as completed even if it is still being processed. One possible consequence is that one or several write operations can affect the next operations. The temporal partitioning mechanism in the embodiment described above is based on access in the worst-case execution time, which is calculated taking into account the usage profile of the mass memory by the partitions.

This is why, in embodiments, the resource sharing controller comprises separate resource sharing sub-blocks responsible for processing each of the different types of commands, for example one resource sharing sub-block only processes commands relative to reading alone and another sub-block processes commands relative to reading/writing. Each sub-block is also adapted for distributing, between the different partitions, the bandwidth of the mass memory corresponding to the worst-case execution and comprises specific queues Z1, Z2, Z3 for each of the partitions.

In one embodiment, for example, in case of "proprietary" memory controller, a command will only be integrated into its performance queue Z2 by the resource sharing controller 5 if the performance of the command is actually completed (no pipeline effect).

The distribution of the processing operations over time done by the resource sharing controller 5 has been described above at partitions with a portion of bandwidth assigned to each partition. In other embodiments, outside the A653 context, this distribution is done at applications with a bandwidth portion assigned to each application, or at processed with a bandwidth portion assigned to each process.

Spatial Partitioning

Taking into account a spatial partitioning of the mass memory requires an analysis and monitoring of disturbance channels caused in particular by the architecture and the technology. In most mass memory solutions, such as SD or SSD cards, the architecture is based on a memory controller and a non-volatile memory, typically flash memory cells called NAND, and the NAND technology can lead to these following partitioning disturbances between applications:

read or write disturbance: a read or write operation at a logic block address (LBA) leads to an unexpected corruption of content stored at one or several adjacent LBA(s);

spare block sharing: a memory block used too many times is declared henceforth unusable; yet these spare blocks being shared between the applications, if an uncontrollable application were to perform too many write operations, it would consume all of the blocks, which would then no longer be available for the other applications.

In a known manner, the spatial partitioning of the platform 1 is provided by assigning specific memory zones dedicated to each partition simultaneously at the set 2 of applications (with buffer memories for reading and writing data at the application level in the RAM CPU), and the file management system (cache memories, file identification memories, etc. in the RAM CPU), the resource sharing controller 5 (data, submission queues Z1, performance Z2, and data areas Z3 physically separated and with access prohibited between partitions, etc. in a volatile RAM memories) and the mass memory 4 (read/write volume(s) dedicated exclusively to each partition). Additionally, the memory protection unit (MPU) of the processor 10, function typically performed by the memory management unit MMU, locks either accesses by the file management system 3 to the partition in progress on the CPU or accesses by the resource sharing controller 5 to the mass memory 4. Aside from these dedicated memories, shared spatial memories are provided: file allocation tables in the file management system 3, configuration logs in the resource sharing controller 5, read-only volumes in the mass memory 4.

In the mass memory 4, the read/write volumes dedicated exclusively to each partition are protected from accesses from partitions other than that to which they are exclusively assigned by the memory protection units and by an organization in the naming space in the NMVe standard in adjacent logic volumes, i.e., in adjacent LBA (logic block address).

In one embodiment, the memory volumes dedicated exclusively to one partition in the mass memory 4 comprise:

a recycling collector comprises storage cells having previously been used for data storage, freed and available to store data to be written via future write commands; and/or a spare assembly comprises spare storage cells intended to replace defective storage cells in the section dedicated to said partition;

which therefore cannot be shared with another partition.

In another embodiment, outside A653 context for example, these elements are dedicated exclusively not to each partition, but to each application or to each process.

In one embodiment, the resource sharing controller 5 is made in the form of a computer program comprising instructions that lead the controller to carry out the steps falling to it under the method described in FIG. 5. It can in particular be stored on a computer-readable medium.

In another embodiment, the resource sharing controller 5 is made in the form of a programmable logic component, such as an FPGA (Field Programmable Gate Array), or in the form of a dedicated integrated circuit, such as an ASIC (Application Specific Integrated Circuit).

The invention claimed is:

1. A resource sharing controller adapted for operating in a computer platform further comprising at least:
 a processor,
 a data storage medium,
 software applications nos. 1 to p adapted for being executed on the processor and comprising access commands to the storage medium,
 said resource sharing controller being adapted for:
 as a function of a respective predetermined portion, allocated to each application, of a maximum access capacity to the storage medium, as a function of a list of next commands of access to the storage medium to be executed derived from each application, and further as a function of the theoretical maximum performance times of said commands, selecting, in a first selection phase, for each application and for a next temporal cycle for access to the storage medium, the next commands to be implemented; and
 successively distributing, during said next temporal cycle, the access to said medium to each application for the implementation of said selected commands, this access of said medium being distributed to application no. p+1 once the selected commands for application no. p have been executed.

2. The resource sharing controller according to claim 1, wherein the maximum access capacity Is an element from among a maximum temporal cycle time for access to the storage medium, a maximum bandwidth of the storage medium and a maximum volume of data exchanged with the storage medium.

3. The resource sharing controller according to claim 1, adapted, when the performance of the commands selected during the first selection phase for the temporal cycle in progress for the applications is completed, in a second selection phase, to select additional commands from among the next commands remaining to Implement for each application, as a function of the time remaining until expiration of the temporal cycle in progress, a weight assigned to each application and theoretical maximum times for performance of said commands.

4. The resource sharing controller according to claim 1, wherein the resource sharing controller is adapted for defining a unitary element corresponding to a data size and associated with a unitary access capacity to the storage medium, determining, for each application, a number of unitary capacities corresponding to the predetermined respective portion that has been assigned to it, said controller further being adapted for determining, for each access command, the number of unitary element(s) corresponding to said access command, such that the access command being relative to a data block, said number of unitary element(s) will be 1 if the block has a size smaller than or equal to that of the unitary element and will be n if the block has a size equal to n times the size of the unitary element, the controller being adapted for selecting, for said application, the next commands to be implemented in the first selection phase as the maximum successive commands such that the sum of the unitary elements corresponding to said commands is less than the number of unitary capacities corresponding to the predetermined respective portion that was assigned to it.

5. The resource sharing controller according to claim 1, wherein commands of the list are derived from a maintenance operation of the data storage medium comprising at least one maintenance operation from among:
- leveling of data storage medium blocks freed by distributing the wear;
- merging blocks or pages to optimize unaligned random accesses; and
- moving blocks to reduce data retention problems.

6. A computer platform comprising:
- a processor,
- a data storage medium,
- software applications adapted for being executed on the processor and comprising access commands to the storage medium, and
- a resource sharing controller according to claim 1.

7. The computer platform according to claim 6, wherein the storage medium comprises storage cells and the computer platform is adapted for dedicating separate specific sections of the data storage medium to separate applications, the storage cells of a section dedicated to an application being accessible to said application and prohibited to the other applications, a section dedicated to an application comprising at least one element from among a recycling collector and a spare assembly such that:
- a recycling collector comprises storage cells having previously been used for data storage and available to store data to be written via future write commands; and
- a spare assembly comprises spare storage cells intended to replace defective storage cells in the section dedicated to said application.

8. A resource sharing method in a computer platform comprising a resource sharing controller, a processor, a data storage medium, software applications nos. 1 to p adapted for being executed on the processor and comprising access commands to the storage medium said method comprising the following steps implemented by the resource sharing controller and consisting of:
  as a function of a respective predetermined portion, allocated to each application, of a maximum access capacity to the storage medium, as a function of a list of next commands of access to the storage medium to be executed derived from each application, and further as a function of the theoretical maximum performance times of said commands, selecting, in a first selection phase, for each application and for a next temporal cycle for access to the storage medium, the next commands to be implemented; and
  successively distributing, during said next temporal cycle, the access to said medium to each application for the implementation of said selected commands, wherein this access of said medium is distributed to application no. p+1 once the selected commands for application no. p have been executed.

9. The resource sharing method in a computer platform according to claim 8, wherein the maximum access capacity is an element from among a maximum temporal cycle time for access to the storage medium, a maximum bandwidth of the storage medium and a maximum volume of data exchanged with the storage medium.

10. The resource sharing method according to claim 8, comprising the step, when the performance of the commands selected during the first selection phase for the temporal cycle in progress for the applications is completed, in a second selection phase, to select additional commands from among the next commands remaining to implement for each application, as a function of the time remaining until expiration of the temporal cycle in progress, a weight assigned to each application and theoretical maximum times for performance of said commands.

\* \* \* \* \*